(12) United States Patent
Satou et al.

(10) Patent No.: US 7,012,589 B1
(45) Date of Patent: Mar. 14, 2006

(54) DISPLAY

(75) Inventors: Toshihiko Satou, Nishitokyo (JP);
Terutaka Okano, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 381 days.

(21) Appl. No.: 09/889,319

(22) PCT Filed: Nov. 16, 2000

(86) PCT No.: PCT/JP00/08094

§ 371 (c)(1),
(2), (4) Date: Oct. 26, 2001

(87) PCT Pub. No.: WO01/37246

PCT Pub. Date: May 25, 2001

(30) Foreign Application Priority Data

Nov. 16, 1999 (JP) ................................. 11-325316

(51) Int. Cl.
*G09G 3/36* (2006.01)
(52) U.S. Cl. ......................................... 345/87; 349/192
(58) Field of Classification Search .......... 345/87–104, 345/904; 349/76, 119, 73–74, 39–46, 191, 349/192; 445/48
See application file for complete search history.

(56) References Cited

U.S. PATENT DOCUMENTS 5,126,868 A * 6/1992 Kizaki et al. ................. 349/76
5,237,438 A * 8/1993 Miyashita et al. .......... 349/119
5,329,387 A * 7/1994 Yanagisawa et al. ......... 349/76

FOREIGN PATENT DOCUMENTS

| JP | 53-127550 | 10/1978 |
| JP | 55-133080 | 10/1980 |
| JP | 57-078021 | 5/1982 |
| JP | 57-096315 | 6/1982 |
| JP | 57-102015 | 6/1982 |
| JP | 59-170882 | 9/1984 |
| JP | 1-211728 | 8/1989 |
| JP | 2-130532 | 5/1990 |
| JP | 2-221919 | 9/1990 |

* cited by examiner

*Primary Examiner*—Chanh Nguyen
*Assistant Examiner*—Srilakshmi K. Kumar
(74) *Attorney, Agent, or Firm*—Finnegan, Henderson, Farabow, Garrett & Dunner, L.L.P.

(57) ABSTRACT

The present invention relates to a liquid crystal display device including a liquid crystal panel having a drive cell and a correction cell to correct a phase difference, and aims to improve a defect of display which occurs due to existence of a defective area in the vicinity of the inside of the seal member of a drive cell and correction cell. The liquid crystal display device includes the liquid crystal panel having the drive cell 1 and the correction cell 11 to correct the phase difference. The liquid crystal panel is structured by being overlapped between the correction cell 11 and the drive cell 1 in the form that the defective area 20*a*2 of the inside is overlapped in the vicinity of the seal member 8 of the drive cell 1, in the range of the normal area 20*b*1 of the correction 11. According to this structure, it is possible to avoid overlapping between the defective areas of the drive cell and the correction cell, and to reduce and improve defects in display due to the defective area.

9 Claims, 7 Drawing Sheets

PRIOR ART

Fig.6

PRIOR ART

Fig.7

PRIOR ART

DISPLAY

TECHNICAL FIELD

The present invention relates to a display device having a display cell and, in particular, relates to a liquid crystal display device having a liquid crystal panel formed of a drive cell as one example of a display cell, and a correction cell as one example of a display cell having a phase difference function. According to the present invention, it is possible to resolve unfavorable and undesirable color which occurs in peripheral portions of the liquid crystal panel.

BACKGROUND ART

As display devices, there are a liquid crystal display device, an EL display device and a plasma display device, each using a display cell. In particular, the liquid crystal display device having the cell filled with the liquid crystal, as a main portion, is a thin type and has a small power consumption, so that it is been widely utilized individually or as display means for a computer, a communication equipment and the like. As a representative liquid crystal display device, there is a known liquid crystal display device using a TN liquid crystal or a STN liquid crystal utilizing the optical rotatory power of the liquid crystal.

In the liquid crystal display device using such liquid crystal, in general, linear polarization of light passing through a polarization board is utilized. In this case, due to an optical anisotropy of liquid molecules in a liquid crystal layer, the incident light is divided into an ordinary ray (O) and an extraordinary ray (E). When the light comes out from the liquid crystal layer, a phase difference occurs between these rays. The phase difference results in unfavorable and undesirable color of an outgoing ray of the liquid crystal cell, as is well known in this field.

Accordingly, in order to prevent such color at the outgoing ray, there is a liquid crystal panel including a liquid crystal cell having a structure, in order to correct the phase difference, in which a normal liquid crystal cell (a drive cell) having drive electrodes is overlapped with a liquid crystal cell (a correction cell) having a function of a phase difference board (i.e., the function for correcting the phase difference due to birefringence of the drive cell).

However, even in such structure, in which the conventional drive cell is overlapped with the correction cell, unfavorable and undesirable color has been not sufficiently eliminated.

ABSTRACT OF THE INVENTION

Therefore, an object of the present invention is to provide a liquid crystal display device, which can resolve the above-mentioned conventional problem of the liquid crystal display device, i.e., reduction of display quality due to unfavorable and undesirable color, which occurs due to a defective area in the vicinity of a seal member of the liquid crystal cell.

Further, another object of the present invention is to provide a liquid crystal display device including an optimum size having economically useful structure.

As a first means to resolve the above problem, the present invention includes a display device comprising; at least one display cell sealed by one seal member in which an electro-optical converting member (for example, a liquid crystal) is held; another at least one display cell sealed by another seal member in which the electro-optical converting member is held; and these display cells being overlapped; characterized in that the display cell provided to an opposite side of an observer has a normal area which is wider than the display cell provided to a side of the observer.

As a second means to resolve the above problem, the present invention includes a liquid crystal device comprising at least one liquid crystal display cell sealed by one seal member in which a liquid crystal is held; another at least one liquid crystal display cell sealed by another seal member in which the liquid crystal is held; and these liquid crystal display cells being overlapped; characterized in that the liquid crystal display cell provided to an opposite side of an observer has an normal area which is wider than the liquid crystal display cell provided to a side of the observer.

As a third means to resolve the above problem, the present invention includes a liquid crystal device comprising a drive cell sealed by a seal member in which a liquid crystal is held; and to which a drive voltage for the liquid crystal is applied; a correction cell sealed by a seal member in which the liquid crystal is held, and to which the drive voltage for the liquid crystal is not applied; and these drive cell and correction cell being overlapped; characterized in that one of outside sizes of the drive cell and the correction cell is larger than the other outside size.

As a fourth means to resolve the above problem, the present invention includes a liquid crystal device comprising a drive cell sealed by a seal member in which a liquid crystal is held; and to which a drive voltage for the liquid crystal is applied; a correction cell sealed by a seal member in which the liquid crystal is held, and to which the drive voltage for the liquid crystal is not applied; and these drive cell and correction cell being overlapped; characterized in that one of inside sizes of the seal member of the drive cell and the seal member of the correction cell is larger than the other inside size.

As a fifth means to resolve the above problem, the present invention includes a liquid crystal device comprising a drive cell sealed by a seal member in which a liquid crystal is held, and to which a drive voltage for the liquid crystal is applied; a correction cell sealed by a seal member in which the liquid crystal is held, and to which the drive voltage for the liquid crystal is not applied; and these drive cell and correction cell being overlapped; characterized in that one of sizes of an effective display area of the drive cell and the effective display area of the correction cell is larger than the other size of the effective display area.

As a sixth means to resolve the above problem, in any one of the second to fifth means, the liquid crystal panel is structured as being overlapped between the drive cell and the correction cell, in the form that a defective area having defects of a cell gap and/or of an alignment in the vicinity of the inside of the seal member of the drive cell is overlapped in the range of the normal area having no defects of the correction cell.

AS a seventh means to resolve the above problem, in the fifth means, the liquid crystal panel is structured as being overlapped between the drive cell and the correction cell, in the form that a defective area having defects of a cell gap and/or of an alignment in the vicinity of the inside of the seal member of the correction cell is overlapped in the range of the normal area having no defects of the drive cell.

As a eighth means to resolve the above problem, in the sixth means, the liquid crystal panel is structured as being overlapped between the drive cell and the correction cell, in the form that the whole liquid crystal area of the inside of the seal member of the drive cell is overlapped in the range of the normal area having no defect, inside of the defective area having defects of a cell gap and/or of an alignment in the vicinity of the inside of the seal member of the correction cell.

As a ninth means to resolve the above problem, in the seventh means, the liquid crystal panel is structured as being overlapped between the drive cell and the correction cell, in the form that the whole liquid crystal area of the inside of the seal member of the correction cell is overlapped in the range of the normal area having no defect, inside of the defective area having defects of a cell gap and/or of an alignment in the vicinity of the inside of the seal member of the drive cell.

As a tenth means to resolve the above problem, in any one of the second means to the ninth means, the liquid crystal is an STN liquid crystal.

BEST MODE FOR CARRYING OUT THE PRESENT INVENTION

Before explanations of preferable embodiments of the present invention are given, a conventional art and its problem will be explained with reference to the drawings.

In this case, in the following explanations, rays S1 and S2 are used for explaining an action causing the color, and do not indicate an observer's eyes. That is, the object of the present invention is to resolve the undesirable and unfavorable color, which occurs in peripheral portions of the display panel when it is observed by the observer, and to determine the optimum size of the display cell having economically useful structure based on visual difference due to the observer's eyes. Accordingly, the rays S1 and S2 are used for analyzing the color.

Figure 5:
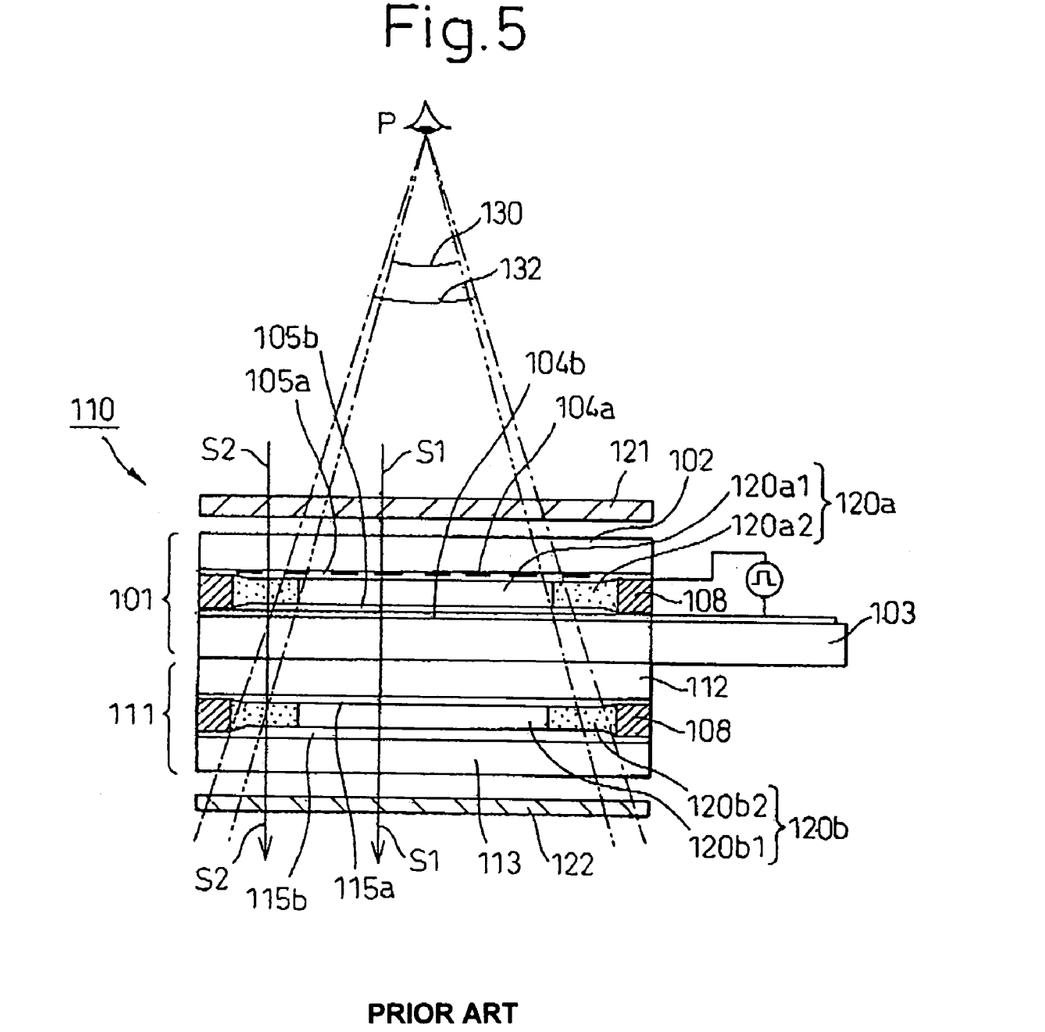
FIG. 5 is a cross-sectional view showing a liquid crystal panel structure having a correction cell according to a conventional liquid crystal display device.

FIG. 5 is the cross-sectional view showing the liquid crystal panel 110 having the correction cell according to the conventional liquid crystal display device. In FIG. 5, 101 denotes the drive cell. In the drive cell 101, 120a denotes the STN liquid crystal layer, and consists of the normal area 120a1 and the defective area 120a2 as explained below, which are held by a transparent upper substrate 102 and a transparent lower substrate 103 surrounded by a seal member 108. 104a denotes an upper drive electrode, and formed closely on a lower surface of the upper substrate 102. 105a denotes an upper alignment film formed closely on the lower surface of the upper substrate 102 by covering the upper drive electrode 104a. 104b denotes a lower drive electrode, and it is formed closely on an upper surface of the lower substrate 103. 105b denotes a lower alignment film formed closely on the upper surface of the lower substrate 103 by covering the lower drive electrode 104b.

Number 111 denotes the correction cell. In the correction cell 111, the STN liquid crystal 120b is the STN liquid crystal layer, and consists of the normal area 120b1 and the defective area 120b2 as explained below, which are held by a transparent upper substrate 112 and a transparent lower substrate 113 surrounded by the seal member 108. However, there is no drive electrode, which is different from the drive cell 101. 115a denotes the upper alignment film formed closely on the lower surface of the upper substrate 112. Number 115b denotes the lower alignment film formed closely on the upper surface of the lower substrate 113.

As shown in FIG. 5, an inner size of the seal member of the drive cell 101 is approximately equal to the inner size of the seal member of the correction cell 111, the normal area 120a1 of the drive cell 101 is overlapped with the normal area 120b1 of the correction cell 111, and the defective area 110a2 of the drive cell 101 is overlapped with the defective area 120b2 of the correction cell 111. 121 denotes a first polarization board, and is arranged closely on or opposite to the outside (upper side) of the upper substrate 102 of the drive cell 101. 122 denotes a second polarization board, and is arranged closely on or opposite to the outside (lower side) of the lower substrate 113 of the correction cell 111.

Figure 6:
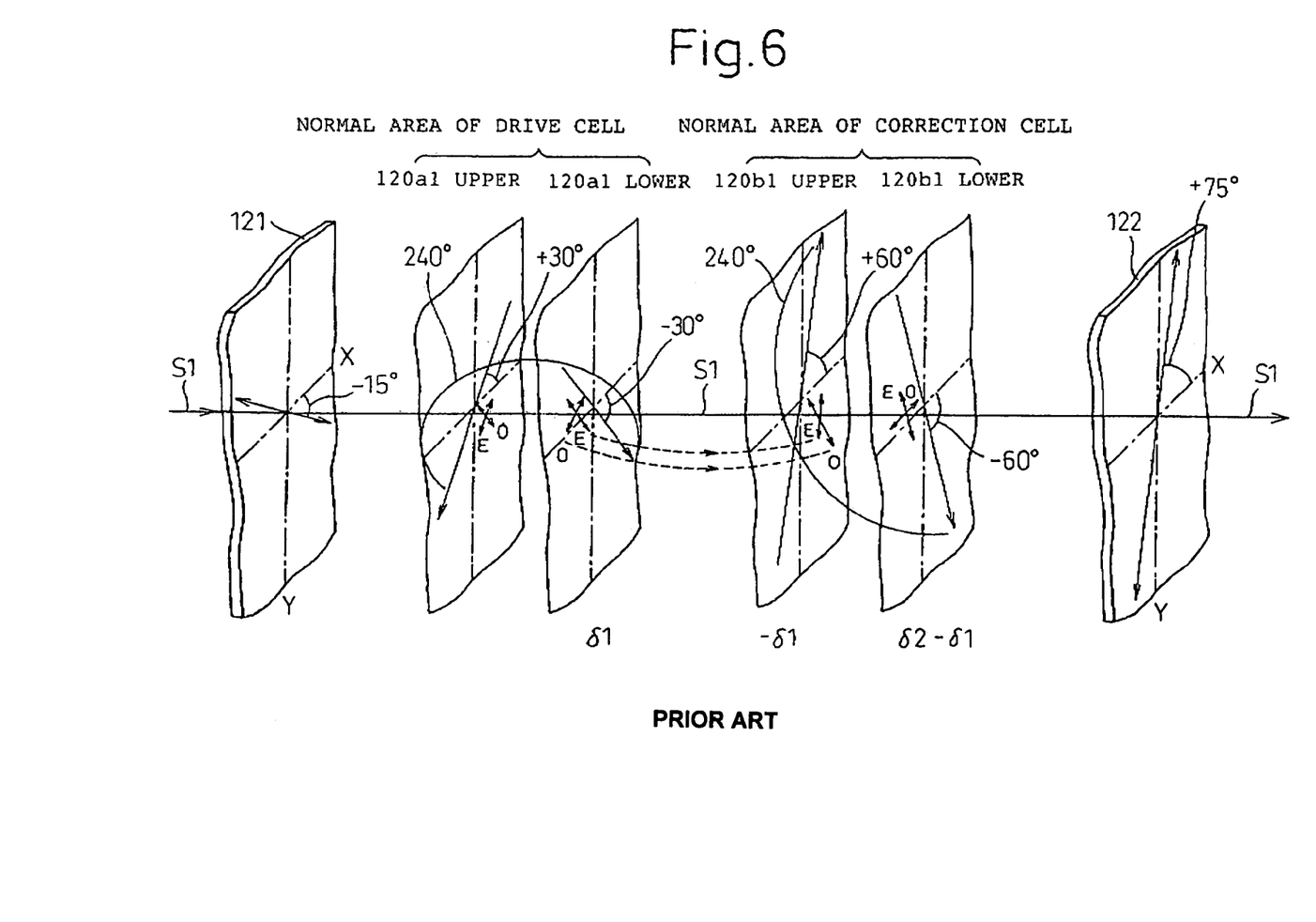
FIG. 6 is a perspective view showing an essential alignment state at the liquid crystal panel shown in FIG. 5.

FIG. 6 is the perspective view showing a polarizing direction of each polarization board and an alignment direction (direction of an optical axis) at the normal area (120a1 and 120b1) of the liquid crystal layer. X- and Y-coordinates are provided for each member as a common coordinate. A rotational direction is determined based on the X-axis.

The action of the liquid crystal panel having the above structure is basically similar to the liquid crystal panel having the "phase difference board" except for the defective areas 120a2 and 120b2 in the vicinity of the seal member 108.

The action of the liquid crystal panel 110 will be explained with reference to FIGS. 5 and 6 below. First, the explanation is given to the action of the ray S1 which is input from the outside to the first polarization board 121, passes through the normal area 120a1 of the drive cell 101, the normal area 120b1 of the correction cell and the like on the way, and is finally output from the second polarization board 122. The polarizing direction of the first polarization board 121 is −15°, the ray S1 input to the polarization 121 is output as the linear polarization having the direction of −15°, and input to the normal area 120a1 of the STN liquid crystal layer through the upper substrate 102 of the drive cell 101 and the upper alignment film 105a.

In the drive cell 101, due to the alignment of the upper alignment film 105a, the direction of the optical axis of the liquid crystal molecule at the upper surface of the normal area 120a1 is +210° (direction opposite to +30°). Due to the alignment of the lower alignment film 105b, the direction of the optical axis of the liquid crystal molecule at the lower surface of the normal area 120a1 is −30°, and the optical axis of the STN liquid crystal at the normal area 120a1 is rotated to the left direction by 240° (rotation like a left-handed screw for the moving direction of the light).

The ray S1 is input to the polarization direction of 45° for the optical axis at the upper surface of the STN liquid crystal layer 120a1 (normal area) as the linear polarization, and separated to the extraordinary ray (E), which oscillates in the direction parallel to the optical axis, and the ordinary ray (O) which oscillates in the direction perpendicular to the optical axis. Further, the ray S1 moves with optical rotation and passes through the lower surface of the STN liquid crystal layer 120a1 (normal area). At that time, the extraordinary ray occurs the phase difference δ1 for the ordinary ray. The ray, which passes through the lower surface of the STN liquid crystal layer 120a1 (normal area), is formed as an elliptically polarized light having the oscillating direction (direction of the optical axis of −30°) of the extraordinary ray (E), the oscillating direction (perpendicular direction of +60°) and a component of the phase difference δ1. Further, the ray is input to the STN liquid crystal layer 120b1 (normal area) of the correction cell, passing through the lower alignment film 105b, the lower substrate 103 of the drive cell 101, the upper substrate 112 of the correction cell 111 and the upper alignment film 115a of the correction cell 111.

In the correction cell 111, due to the alignment of the upper alignment film 115a, the direction of the optical axis of the liquid crystal molecule at the upper surface of the normal area 120b1 is +60°. Due to the alignment of the lower alignment film 115b, the direction of the optical axis of the liquid crystal molecule at the lower surface of the normal area 120b1 is −60° C. The optical axis of the STN liquid crystal at the normal area 120b1 is rotated to the right direction by 240° (rotation like a right-handed screw for the moving direction of the light).

In the incident light, a light component at the oscillating direction (−30°) of the extraordinary ray (E) is input based on the oscillating direction having an angle of approximately perpendicular, moved by 90°, to the direction of the optical axis +60°, at the upper surface of the STN liquid crystal layer 120b1 (normal area) of the correction cell, so that the component becomes a main component of the ordinary ray (O). Another light component at the oscillating direction (+60°) of the ordinary ray is input based on the oscillating direction having an angle of approximately parallel, having 0°, to the direction of the optical axis +60°, at the upper surface of the STN liquid crystal layer 120b1 (normal area) of the correction cell, so that the component becomes a main component of the extraordinary ray (E). In this case, the extraordinary ray (E) has the phase difference of approximately −δ1 for the ordinary ray (O).

The ordinary ray (O) and extraordinary ray (E) are moved with the rotation of the optical axis at the STN liquid crystal layer 120b1 (normal area), and are passed at the lower surface of the STN liquid crystal layer 120b1 (normal area). At that time, the phase difference of the extraordinary ray (E) is increased by δ2 for the ordinary ray (O), and becomes (δ2−δ1). When the final phase difference (δ2−δ1) is zero, it is possible to set the light transmitted from the polarization board 122 to the maximum value by setting the polarizing direction of the polarization board 122 to the angle +75°, i.e. +45° for the direction −60° (+120°) of the optical axis at the lower surface. In actuality, the polarization direction is set to an appropriate angle with adjustment by considering another characteristic of the liquid crystal.

In general, when the ordinary ray is overlapped with the extraordinary ray and moved to the same direction, a polarization mode of the light is formed by the oscillation composed with the ordinary ray and extraordinary ray. The intensity of the transmission light determined by the composed polarization mode is changed in accordance with change of the phase difference δ between the ordinary ray and the extraordinary ray along with movement of the light. That is, when there is no rotation of the optical axis, and when the thickness of the liquid crystal layer is "d", the wavelength of the light is λ, and the birefringence which is expressed by the difference |no−ne| between the refractive index "no" of the ordinary ray and the refractive index "ne" of the extraordinary ray is Δn, the phase difference δ becomes "δ=2πdΔn/λ". Further, the intensity I of the transmission light depends on $\sin^2 (δ/2)$, i.e. $\sin^2 (πdΔn/λ)$, and is changed in accordance with the thickness "d" of the liquid crystal layer and the wavelength λ of the light.

Next, when there is a rotation of the optical axis, the phase difference is changed depending on the rotational (twisted) angle and direction in addition to the effects of the thickness "d" and change of coordinate. The phase difference δ is determined depending on the above-mentioned πdΔn/λ and the twisted angle (also considering the direction). In this case, since the intensity I of the transmission light depends on $\sin^2 (δ/2)$, i.e. the phase difference, the intensity is changed depending on the wavelength λ as well as the above explanation. Accordingly, when the liquid crystal layer is one layer, the thickness "d" and the twisted angle are selected in such a way that the intensity I of the transmission light becomes maximum for the light having a particular wavelength λ, and the selected liquid crystal layer is structured. At that time, for the light having different waveform λ from the above light, the intensity I of the transmission light becomes weaker than in the above case. That is, the above liquid crystal layer has a characteristic in which the light having a particular wavelength or a wavelength close to the particular wavelength is selectively transmitted in accordance with the thickness "d" of the liquid crystal layer and the twisted angle. As a result, undesirable and unfavorable color occurs on the screen.

Accordingly, in the case of the present embodiment, the drive cell 101 is overlapped with the correction cell 111, the phase difference δ1 which occurs at the STN liquid crystal layer 120a1 (normal area) of the drive cell 101 is corrected by the phase difference δ2 which occurs at the STN liquid crystal layer 120b1 (normal area) of the correction cell 111. In this case, in the STN liquid crystal layer 120a1 (normal area) and STN liquid crystal layer 120b1 (normal area), by setting the direction of the rotation (twisted) angle to an opposite direction one another, the phase difference δ1 is equal to the phase difference δ2, and it is possible to finally set the phase difference (δ1−δ2) to approximately zero. AS a result, it is possible to effectively prevent undesirable and unfavorable color in the normal area.

In this case, when a drive voltage is added between an upper drive electrode 104a and a lower drive electrode 104b of the drive cell, and when the twist of the liquid crystal molecule is changed in the STN liquid crystal layer 120a of the drive cell 101 and reduced, the twist of the polarization passing through this portion is also changed finally, and the angle of the polarization from the STN liquid crystal layer 120b in the correction cell 101. As a result, in the outgoing light from the second polarization film 122, the brightness of the outgoing light passing through the STN liquid crystal layer 120a to which the drive voltage is added becomes different from another portion so that the pattern is displayed in accordance with data.

As shown in FIG. 5, however, there are problems in the conventional liquid crystal device having the correction cell as explained in detail below.

In FIG. 5, in the STN liquid crystal layer 120a of the drive cell 101, the alignment direction (twisted direction of molecule, etc.) of the liquid crystal molecule is normal at the normal area 120a1 of the central portion, and the thickness of the layer (or cell gap) is uniform. On the other hand, in the defective area 120a2 at the peripheral portion, the alignment direction of the liquid crystal molecule is not normal compared to the central portion, and the thickness of the layer is not uniform. Such defects occur for the following reasons. That is, in the vicinity of the seal member 108, when the seal member 108 is joined with the upper alignment film 105*a* and the lower alignment film 105*b*, the hardening and non-hardening impurities are dissolved from the seal member into the liquid crystal. As a result, the impurities affect bad influence to the liquid crystal so that the alignment state of the liquid crystal is changed. Further, the thickness of the alignment film is also changed due to influence of pressed-adhesive processes in the manufacturing line so that the thickness of the liquid crystal layer is also changed. The same defect also occurs in the normal area 120*b*1 of the STN liquid crystal layer 120*b* and the defective area 120*b*2 of the correction cell 111.

Figure 7:
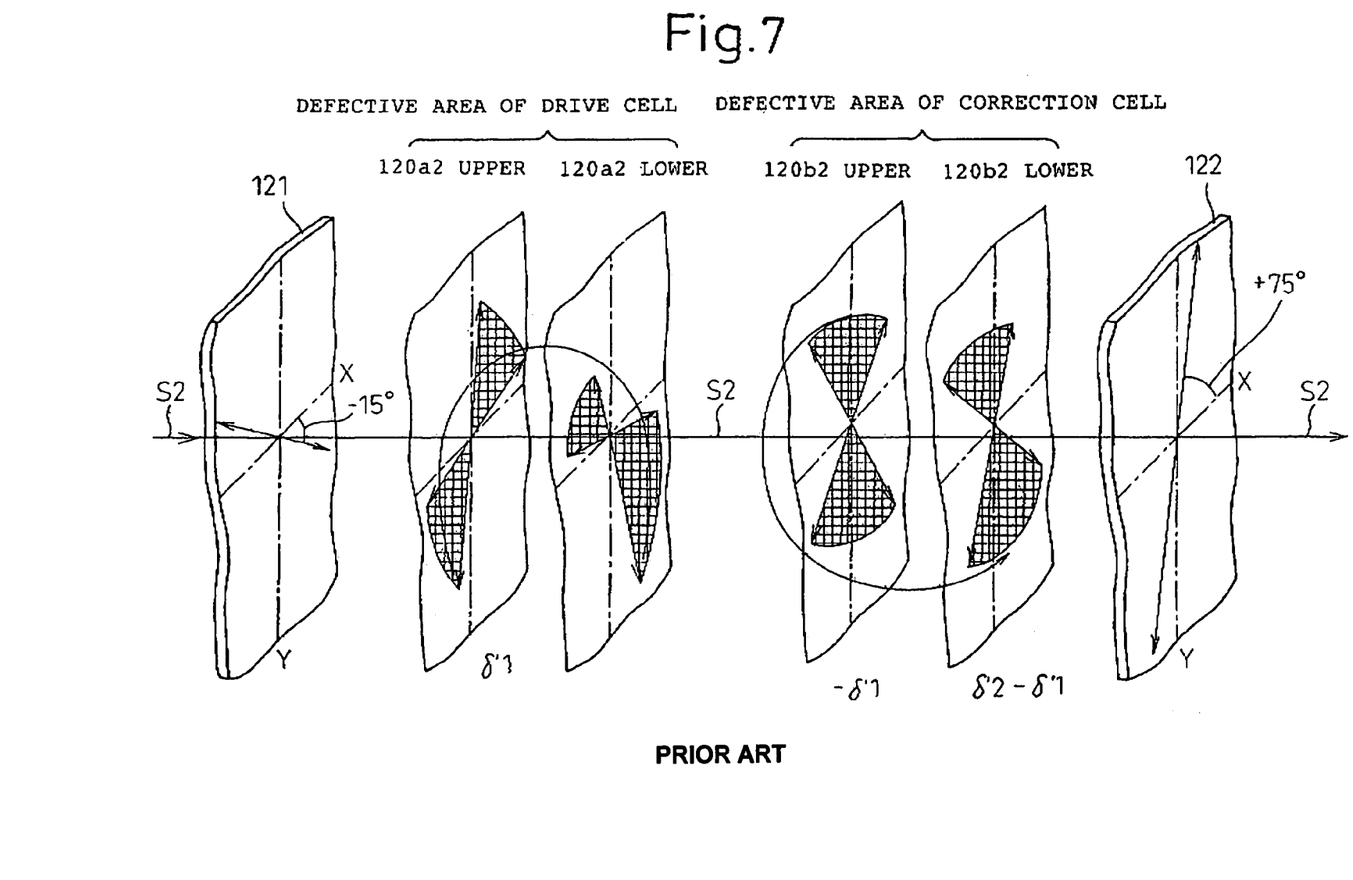
FIG. 7 is a perspective view showing an essential alignment state including the defective area at the liquid crystal panel shown in FIG. 5.

FIG. 7 is a perspective view for explaining the polarizing direction of each polarization board and the alignment direction (direction of optical axis) at the defective area 120*a*2 of the STN liquid crystal layer of the drive cell 101 and at the defective area 120*b*2 of the STN liquid crystal layer of the correction cell 111. In FIGS. 5 and 7, S2 is a ray passing through the defective area 120*a*2 of the drive cell 101 and the defective area 120*b*2 of the correction cell 111.

In this case, action of the ray S2 will be explained below. In the defective area 120*a*2 of the drive cell 101 and the defective area 120*b*2 of the correction cell 111, since the alignment of the liquid crystal is not normal as mentioned above, the direction of the optical axis depending on the direction of the liquid crystal molecule becomes irregular. For example, the direction of the optical axis is dispersed in the range of the slanted area in FIG. 7, the birefringence Δn is changed and the thickness is not uniform. Further, the rotational angle of the optical axis may not be set to a predetermined angle, different from the case of the normal area. Accordingly, the phase difference of the transmission light becomes δ1' which is different from the value δ1 at the normal area for the abnormal area 120*a*2 of the drive cell 101.

In this situation, the ray S2 inputted to the defective area 120*b*2 of the correction cell 111 suffers the phase difference δ2' which is different from the phase difference δ2' at the normal area. Further, the final phase difference is set to the value (δ2'-δ1') and is largely moved from zero due to addition of errors, so that undesirable and unfavorable color occurs on the screen.

Next, as shown in FIG. 5, a part of an effective view-field range 130, which is obtained by observing the range of the normal area 120*a*1 of the drive cell 101 from the viewpoint P, includes the defective area 120*b*2 of the correction cell 111 so that this part is colored due to the influence of the phase difference δ2'. Further, a part of the whole view field area 132, which is obtained by observing the whole area of the seal member of the correction cell 111 from the viewpoint P, includes the defective area 120*a*2 of the drive cell 101 and the defective area 120*b*2 of the correction cell 111 which is overlapped with the defective area 110*a*2 so that this part is affected by the phase differences δ1' and δ2' and results in dark color. As a result, undesirable and unfavorable color occurs in the peripheral portion of the view field so that the quality of the image deteriorates.

On the other hand, for example, in the Japanese Unexamined Patent Publication No. 2-130531 (liquid crystal display element), a liquid crystal display element having the following structure has been disclosed. That is, a first liquid crystal cell is overlapped with a second liquid crystal cell between the first and second polarization boards, and the outside size of the seal member of the first liquid crystal cell is smaller than that of the seal member. However, this example aims to improve a working efficiency at the manufacturing of the liquid crystal element by moving the position of an injecting inlet of the liquid crystal of the second liquid crystal cell from the injecting inlet of the first liquid crystal cell. Accordingly, this example does not change the outside size of the seal member in order to resolve undesirable and unfavorable color at the peripheral area of the display panel. Further, in this example, there are no explanation and teaching of a positional relationship of an observer to observe the liquid crystal display panel.

Further, in the Japanese Unexamined Patent Publication No. 2-116825 (liquid crystal display element), a liquid crystal display device, in which a liquid crystal cell for display is overlapped with a liquid crystal cell for an optical compensation, has been disclosed. However, this example includes a light-cutting member formed of a positive-type photo-regist, and there is no disclosure of change of the outside size of the liquid crystal cell in order to resolve undesirable and unfavorable color at the peripheral portion of the display panel. Further, in this example, there are no explanation and teaching for the position relationship of the observer to observe the liquid crystal display panel.

Therefore, as explained in detail below, the present invention aims to provide a liquid crystal display device which can resolve the problem of a liquid crystal panel including a correction cell to correct the phase difference due to the birefringence of the drive cell in a conventional liquid crystal display device, i.e. the problem in which the quality of the display deteriorates due to undesirable and unfavorable color which occurs based on the defective area in the vicinity of the seal member of the liquid crystal cell.

The preferable embodiment will be explained with reference to the attached drawings below. This embodiment relates to the liquid crystal display device including the liquid crystal panel having the drive cell and the correction cell.

Figure 1:
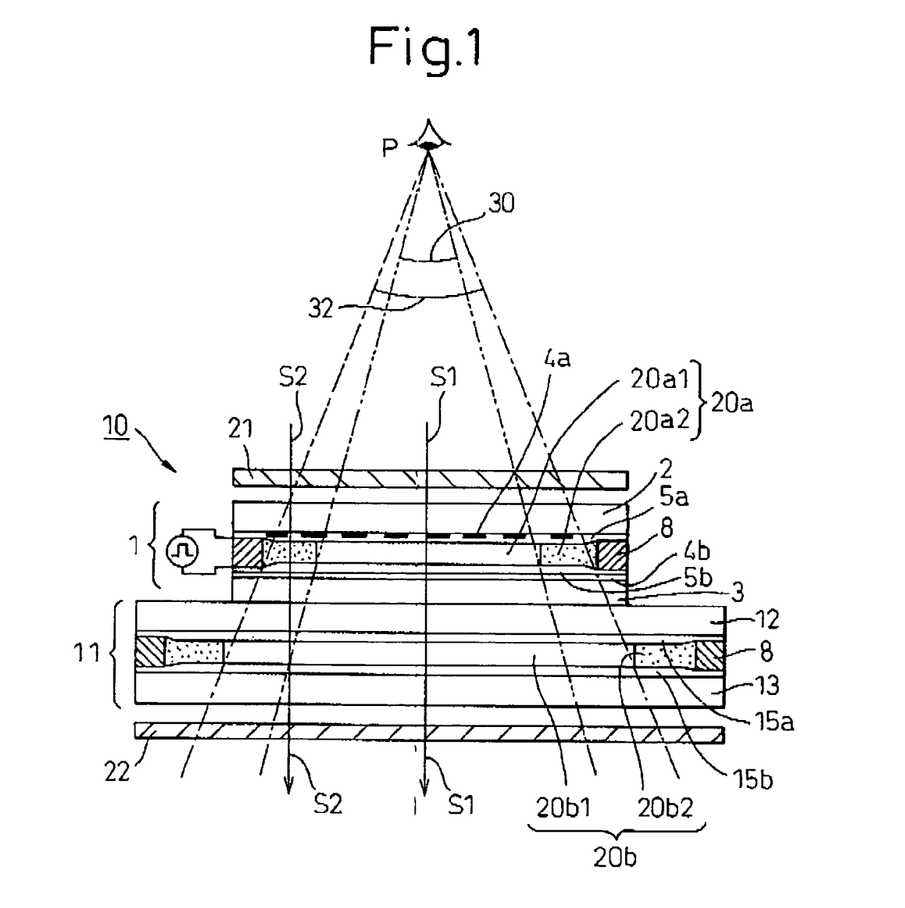
FIG. 1 is a cross-sectional view showing a liquid crystal panel structure having a correction cell according to one embodiment of the present invention.

FIG. 1 is a cross-sectional view for explaining an essential part of the liquid crystal panel 10 used in the embodiment of the present invention. In FIG. 1, number 1 is a drive cell. In the drive cell 10, number 20*a* is an STN liquid crystal layer, and is formed by a normal area 20*a*1 and a defective area 20*a*2 as mentioned below. The STN liquid crystal layer 20*a* is held by a transparent upper substrate 2 and a transparent lower substrate 3, and surrounded by a seal member 8. Number 4*a* is an upper drive electrode, and formed closely to the lower surface of the upper substrate 2. Number 5*a* is an upper alignment film formed closely to the lower surface of the upper substrate 2 so as to cover the upper drive electrode 4*a*. Number 4*b* is a lower drive electrode and formed closely to the upper surface of the lower substrate 3. Number 5*b* is a lower alignment film formed closely to the upper surface of the lower substrate 3 so as to cover the lower drive electrode 4*b*.

Number 11 is a correction cell. In the correction cell 11, number 20*b* is an STN liquid crystal layer, and formed by a normal area 20*b*1 and a defective area 20*b*2 as mentioned below. The STN liquid crystal layer 20*b* is held by a transparent upper substrate 12 and a transparent lower substrate 13, and is surrounded by a seal member B. Number 15*a* is an upper alignment film formed closely to the lower surface of the upper substrate 12. Number 15*b* is a lower alignment film formed closely to the upper surface of the lower substrate 13. The correction cell 11 has no drive electrode different from the drive cell 1, but it may include the drive electrode.

An inside size of the seal member of the correction cell 11 is sufficiently larger than the inside size of the drive cell 1, and the inside size (outside size of the normal area 20*b*1) of the defective area 20b2 of the correction cell 11 is sufficiently larger than the defective area 20a2 of the drive cell 1. The lower substrate 3 of the drive cell 1 is arranged on the upper substrate 12 of the correction cell 11, and the liquid crystal display device includes the correction cell 11 and the drive cell 1. At that time, the positioning is executed in such a way that the defective area 20a2 of the drive cell 1 is overlapped with the normal area 20a1 of the drive cell 1 in the range of the normal area 20b1 of the correction cell 11. That is, defective area 20a2 of the drive cell 1 is not overlapped with the defective area 20b2 of the correction cell 11 in the present invention.

Number 21 is a first polarization board, and is arranged closely to or opposite to the outside (upper side) of the upper substrate 2 of the drive cell 1. Number 22 is a second polarization board, and is arranged closely to or opposite to the outside (lower side) of the lower substrate 13 of the correction cell 11. As shown in FIG. 1, the liquid crystal panel 10 includes the drive cell 1, the correction cell 11, the first polarization board 21 and the second polarization board 22.

In the above structure, the action of the liquid crystal panel 10 will be explained with reference to FIG. 1. First, the action of the ray S1 is explained below. The ray S1 is input from the outside to the first polarization board 21, and passes through the normal area 20a1 of the drive cell 1, the normal area 20b1 of the correction cell 11 and the like. Finally, the ray S1 is output from the second polarization board 22 to the outside. This action is the same as the ray S1 explained in FIGS. 5 and 6 in the conventional art. Based on the same principle, the phase difference δ1 of the ordinary ray and the extraordinary ray occurred in the STN liquid crystal layer 20a1 (normal area) of the drive cell 1 is corrected by the phase difference δ2 occurred in the STN liquid crystal layer 20b1 (normal area) of the correction cell 11. That is, the phase differences δ1 and δ2 are approximately equal to one another, and the final phase difference (δ2−δ1) can be set to approximately zero. AS mentioned above, it is possible to resolve undesirable and unfavorable color at the normal area in the present invention.

Next, the difference points between the present invention and the conventional art will be explained below. As shown in FIG. 1, the action of the ray S2, which is input from the outside to the first polarization board 21 and passes through the defective area 20a2 of the drive cell 1, is explained below. In this embodiment, as explained above, the defective area 20a2 of the drive cell 1 is not overlapped with the defective area 20b2 of the correction cell 11, and overlapped with only the normal area 20b2. Accordingly, the ray S2 passes through the normal area 20b1 of the correction cell, and is finally output from the second polarization board 22 to the outside.

When the ray S2 passes through the defective area 20a2 of the drive cell 1, the phase difference δ1', which is different from the phase difference δ1 occurring in the normal area 20a1, occurs based on the same principle as explained in FIGS. 5 and 7. When the ray S2 passes through the normal area 20b1 of the correction cell 11, a new phase difference δ2' occurs based on the same principle as explained in FIGS. 5 and 6, so that the final phase difference (δ2'−δ1') can be obtained. This phase difference is moved from zero, and results in color based on the above-explained principle.

As explained above, the ray S2, which passes through the abnormal area 20a2 of the drive cell 1, is slightly colored differently from the ray S1 that passes through the normal area 20a1 of the drive cell 1. However, in the case of this embodiment, since there is no overlapping of the cells as explained in the conventional art between the defective areas, the final phase difference is affected only by movement due to the abnormal area 20a2 of the drive cell 1. Further, in the conventional art of FIG. 5, since both abnormal areas of the drive cell and correction cell are overlapped, the influence of both abnormal areas is added to the final phase difference for the transmission light of the abnormal area so that the ray is largely moved from zero. Accordingly, in this embodiment, since the brightness of the abnormal area is different from the normal area, the abnormal area is slightly colored. However, the grade of color becomes considerably smaller compared to the conventional art, and has an allowable range from the viewpoint of quality of image.

Next, as shown in FIG. 1, the defective area 20b2 is not included in a part of the range of the effective view field which is obtained by observing the range of the normal area 20a1 of the drive cell 1 from the view point P, and the part of the range of the effective view field is not colored. Further, although the defective area 20a2 is included in the part of the whole view field area 32 which is obtained by observing the whole area of the seal member of the correction cell 11 from the view point P, the defective area 20b2 of the correction cell is not included in the part of the view field so that the color of the peripheral portion of the whole view field area 32 becomes light compared to the conventional art. As a result, the quality of image, which is observed from the view point P, is considerably improved compared to the conventional art.

Figure 2:
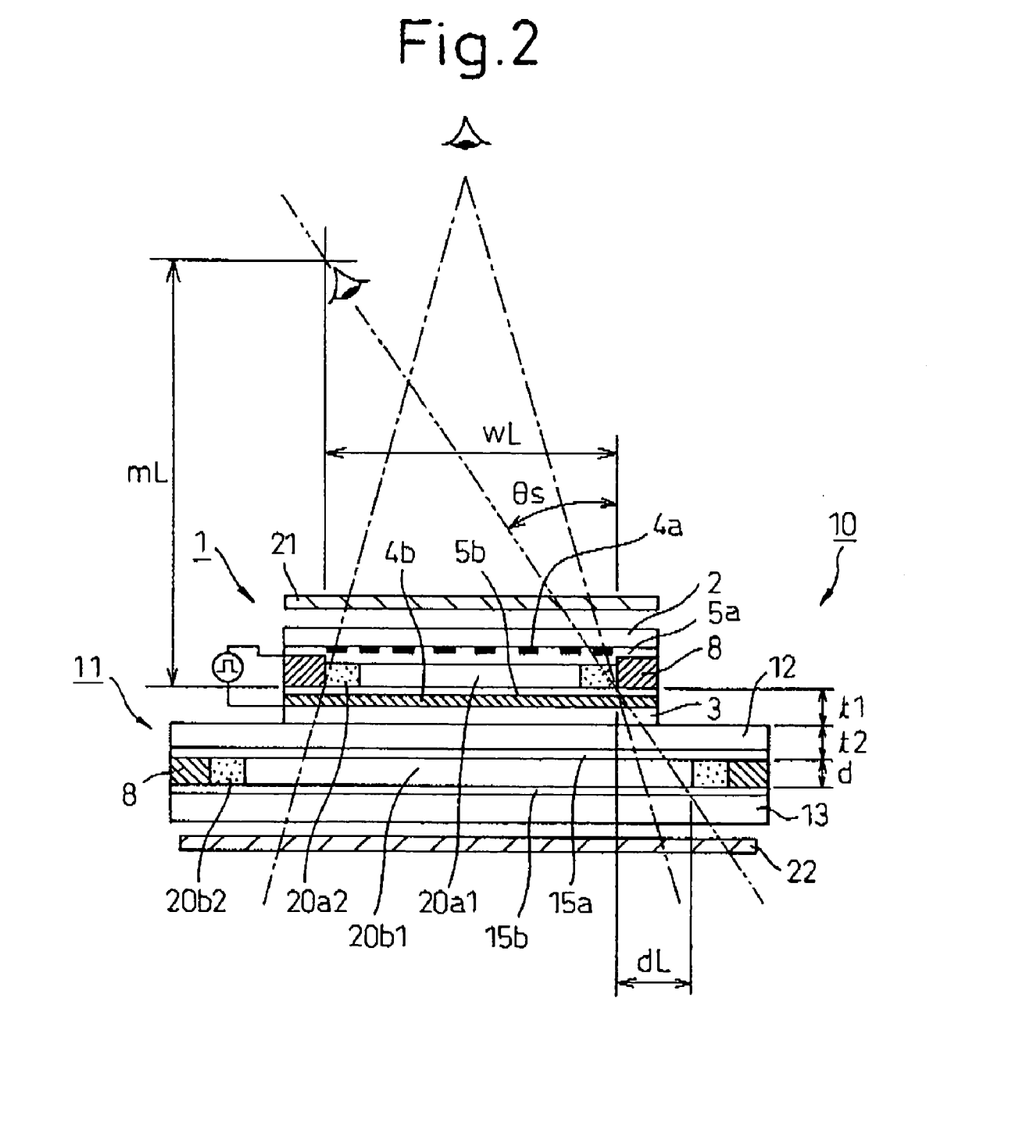
FIG. 2 is a cross-sectional view showing a liquid crystal panel structure according to another embodiment of the present invention.

Another embodiment according to the present invention will be explained with reference to the drawings below. This embodiment is a modified type of the liquid crystal display device as explained in FIG. 1. FIG. 2 is a cross-sectional view for explaining a main structure of the liquid crystal panel according to the embodiment of the present invention. The liquid crystal panel of this embodiment is structured in such a way that the incident light is input from the correction cell 11 and output from the drive cell 1. Further, the difference "dL" in size, which is obtained by the difference between the size of the normal area 20b1 of the correction cell 11 and the outside size (or an inside size of the seal member) of the defective area 20a2 of the drive cell 1, satisfies predetermined conditions. In this case, reference numbers of the structural members in FIG. 2 are the same as those of FIG. 1.

Based on the above structure, the action of this embodiment will be explained below. When the light is input from the lower side of the second polarization board 22, the transmission light is output from the first polarization board 21 through a light path opposite to the liquid crystal panel shown in FIG. 1. This is basically similar to a characteristic of the final outgoing light of the liquid crystal panel shown in FIG. 1. In this embodiment of the liquid crystal panel, however, consideration for relationship of the size is provided as explained below.

As one relationship of the size, when an angle of the maximum view field based on an inside end of the seal member 8 of the liquid crystal is θs; when the thickness of the lower substrate 3 of the drive cell 1 is t1, and the thickness of the upper substrate 12 of the correction cell 11 is t2; when the thickness (or cell gap) of the STN liquid crystal layer 20b1 of the correction cell 1 is "d"; and when the distance, which is determined as the boundary of the normal area 20b1 of the correction cell 11 being moved to the outside from the boundary of the seal member 8 of the drive cell 1 and the defective area 20a2, is "dL"; it is necessary for these conditions to have the following relationship, i.e.

$$dL > (t1+t2+d) \cdot \tan \theta s \quad (1)$$

When the relationship of the formula (1) is satisfied, the light, which passes through the defective area 20a2 of the drive cell 1 and is output to the direction of the view field θs, is transmitted through the normal area 20b1 of the correction cell 11 and is not transmitted through the defective area 20b2. As a result, the influence of two defective areas 20a2 and 20b2 is not added to the outgoing light, and it is possible to achieve the purpose of the present invention in the range of the angle of the maximum view field θs. In the formula (1), a curve (a move from a straight line) due to the refraction of the transmission light and the thickness of the alignment films 5b, 15a are negligible because of small values.

As another relationship of the size, when the range of clear vision based on the lower surface of the STN liquid crystal layer 20a1 of the drive cell 1 is "mL"; when the width of the sealed space (inside of the seal member) of the drive cell 1 is "wL"; when the thickness of the lower substrate 3 of the drive cell 1 is t1 and the thickness of the upper substrate 12 of the correction 11 is t2; when the thickness (or cell gap) of the STN liquid crystal layer 20b1 is "d"; and when the distance, which is determined as the boundary of the normal area 20b1 of the correction cell 11 being slipped to the outside from the boundary of the seal member 8 of the drive cell 1 and the defective area 20a2, is "dL"; it is necessary for these conditions to have the following relationship, i.e.

$$dL/(t1+t2+d) > wL/mL \quad (2)$$

When the relationship of the formula (2) is satisfied, the light, which passes through the defective area 20a2 of the drive cell 1 and passes through the range (mL) of clear vision in the front of the liquid crystal panel, is transmitted through the normal area 20b1 of the correction cell 11 and is not transmitted through the defective area 20b2. As a result, when the liquid crystal panel is observed from the range (mL) of clear vision, it is possible to observe the display image having few defects based on the same reasons as above.

In this case, the embodiment of the present invention shown in FIG. 2 has the relationship of the size which satisfies both formulas (1) and (2). In the present invention, however, the present invention is not limited above, and may have the relationship of size which satisfies any one of the formulas (1) and (2).

Figure 3:
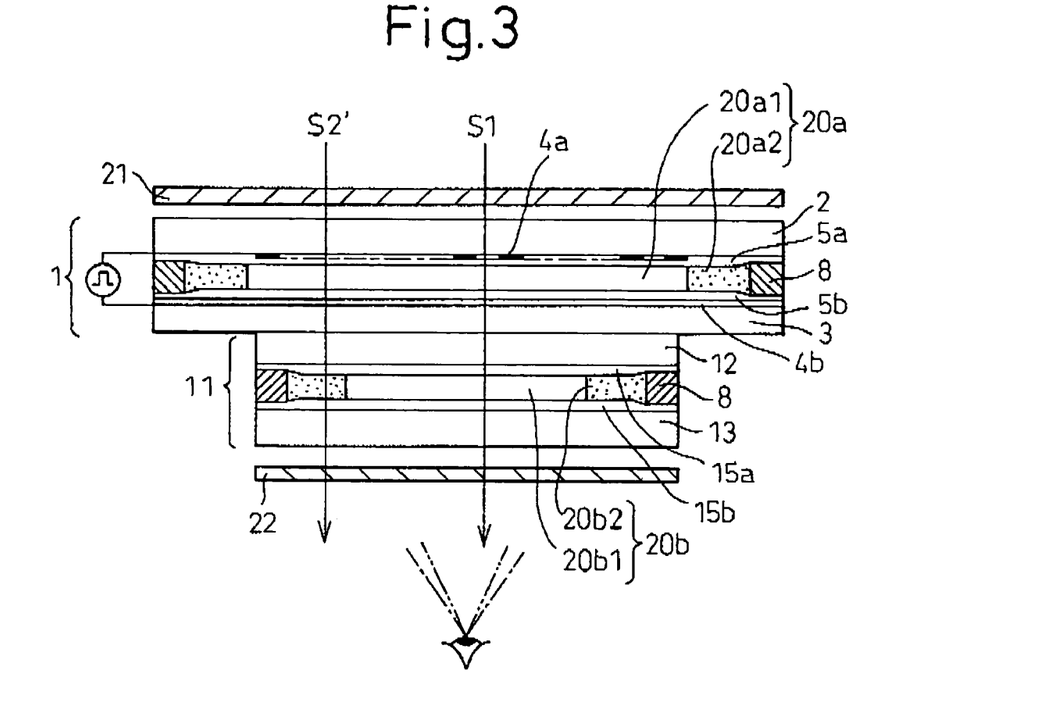
FIG. 3 is a cross-sectional view showing a liquid crystal panel structure according to still another embodiment of the present invention.
Figure 4:
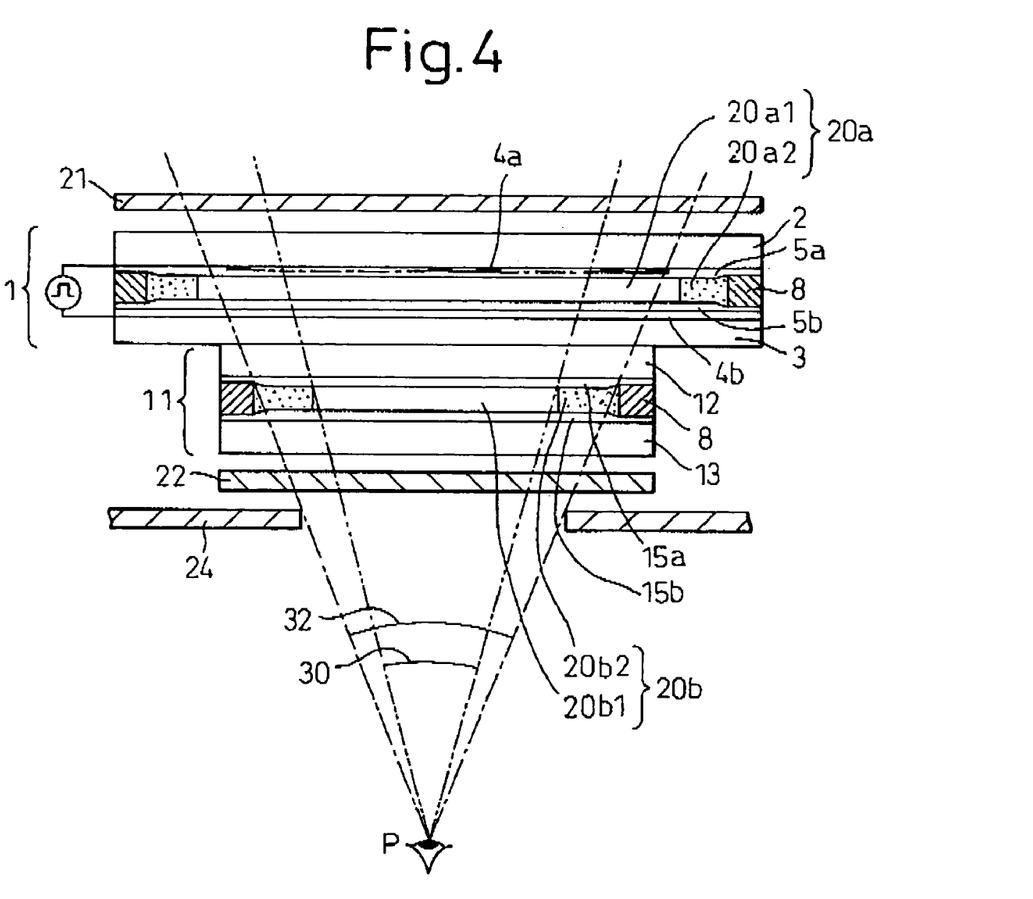
FIG. 4 is a cross-sectional view showing a modified structure of the liquid crystal panel shown in FIG. 3.

Still another embodiment of the present invention will be explained with reference to the drawings below. This embodiment is a modified type of the liquid crystal device shown in FIG. 1. FIG. 3 is a cross-sectional view for explaining the structure of the liquid crystal panel according to this embodiment. FIG. 4 is a cross-sectional view for explaining the modified type of the liquid crystal panel shown in FIG. 3. As shown in FIG. 3, in this embodiment, the inside size of the seal member of the drive cell 1 is larger than the of the seal member of the correction cell 11, the defective area 20b2 of the correction cell 11 is overlapped with the normal area 20b1 in the normal area of the drive cell 1, and the defective area 20a2 of the drive cell 1 is not overlapped with the defective area 20b2 of the correction cell 11.

Others are the same as the embodiment shown in FIG. 1. As the ray which is transmitted through the liquid crystal panel 10 in this embodiment, there are two rays, i.e. the ray S1 being transmitted through the normal area 20b1 of the correction cell 11 and the ray S2' being transmitted through the defective area 20b2 of the correction cell 11. The ray S1 is transmitted through only the normal area, and has the same characteristic as the ray S1 shown in FIG. 1. The ray S2' is transmitted through the normal area and defective area, and has the same characteristic as the ray S2 shown in FIG. 1. Accordingly, it is possible to achieve the display image having little defects caused by the defective area in this embodiment.

Next, in FIG. 4, number 24 is a partition board on the second polarization board 22. Others are the same as the embodiment shown in FIG. 3. AS shown in FIG. 4, the defective area 20a2 of the drive cell 1 is not included in the range of the effective view field which is obtained by observing the range of the normal area 20b1 of the correction cell 11 from the view point P, and there is no color in a part of the range of the effective view field. Further, in the whole area of the seal member of the correction cell 11 observed from the view point P, although the defective area 20b2 of the correction cell 11 is included in a part of the whole view field area 32 separated by the partition board 24, the defective area 20a2 of the drive cell 1 is not overlapped with the view field area. Accordingly, the color in the peripheral portion of the whole view field area 32 is light compared to the conventional art. As a result, the quality of image, which is observed from the view point P, is considerably improved compared to the conventional art.

In the above embodiment, although the explanation is given to the case in which the drive cell is combined with the correction cell, it is possible to obtain the same effect as the above embodiment in the case that two drive cells are overlapped. Further, in the above embodiment, although the explanation is given to the case in which two display cells are overlapped, it is possible to obtain the same effect as the above embodiment in the case that a plurality of display cells, for example, three cells, four cells, etc. are overlapped, by structuring in such a way that the display area of the display cell provided away from the observer is gradually formed wider than the display area of the display cell provided at the observer's side.

POSSIBILITY OF UTILIZATION IN INDUSTRY

According to the present invention, in the liquid crystal display device including the display panel having the correction cell to correct the phase difference due to the birefringence of the drive cell, it is possible to resolve the defect of display due to undesirable and unfavorable color which occurs based on the defective area in the vicinity of the inside of the seal member of the drive cell and the correction cell. As a result, the present invention can be utilized widely as a simple display means or a display means used in computers or communication equipments having a thin shape and low power consumption using the TN liquid crystal or the STN liquid crystal utilizing rotatory power of the liquid crystal. Further, when the observer observes the display device from the upper side, although the lower display cell is observed rather more widely than the upper display cell, it is possible to provide the liquid crystal device which can resolve the difference in the range observed by the observer so that the possibility of utilization in industry is very good.

What is claimed is:

1. A display device comprising at least one display cell sealed by one seal member in which an electro-optical converting member is held by two substrates, said electro-optical converting member having a defective area and normal area in the inside of the one seal member; another at least one display cell sealed by another seal member in which another electro-optical converting member is held by two substrates, and said another electro-optical converting member having a defective area and a normal area in the inside of the another seal member; these display cells being overlapped; wherein, the electro-optical converting member of the display cell provided to an opposite side of an observer has a normal area which is wider than that of the normal area of the electro-optical converting member of the display cell provided to a side of the observer.

2. The display device as claimed in claim 1, wherein the display cells are liquid crystal display cells in which the electro-optical converting member consists of a liquid crystal.

3. The display device as claimed in claim 2, wherein the display device is formed by overlapping two liquid crystal display cells, and at least one liquid crystal display cell is a drive cell to which a liquid crystal drive voltage is applied.

4. The display device as claimed in claim 2, wherein the display device is formed by overlapping two liquid crystal display cells, one liquid crystal display cell being a drive cell to which a liquid crystal drive voltage is applied, and the other liquid crystal display cell a correction cell to which a liquid crystal drive voltage is not applied.

5. The display device as claimed in claim 4, wherein in the drive cell and the correction cell, one of inside sizes of the seal member of the drive cell and the seal member of the correction cell is larger than the other inside size.

6. The display device as claimed in claim 4, wherein in the drive cell and the correction cell, one of sizes of an effective display area of the drive cell and an effective display area of the correction cell is larger than the other size of the effective area.

7. The display device as claimed in claim 5 or 6, wherein the display device is structured by overlapping the drive cell with the correction cell, in the form that the defective area having defects of cell-gap and/or of alignment in the vicinity of the inside of the seal member of the drive cell is overlapped in the range of the normal area of the correction cell.

8. The display device as claimed in claim 5 or 6, wherein the display device is structured by overlapping the drive cell with the correction cell, in the form that the defective area having defects of cell-gap and/or of alignment in the vicinity of the inside of the seal member of the correction cell is overlapped in the range of the normal area of the correction cell.

9. The display device as claimed in claim 2 wherein the liquid crystal is an STN liquid crystal.

* * * * *